1,641,683

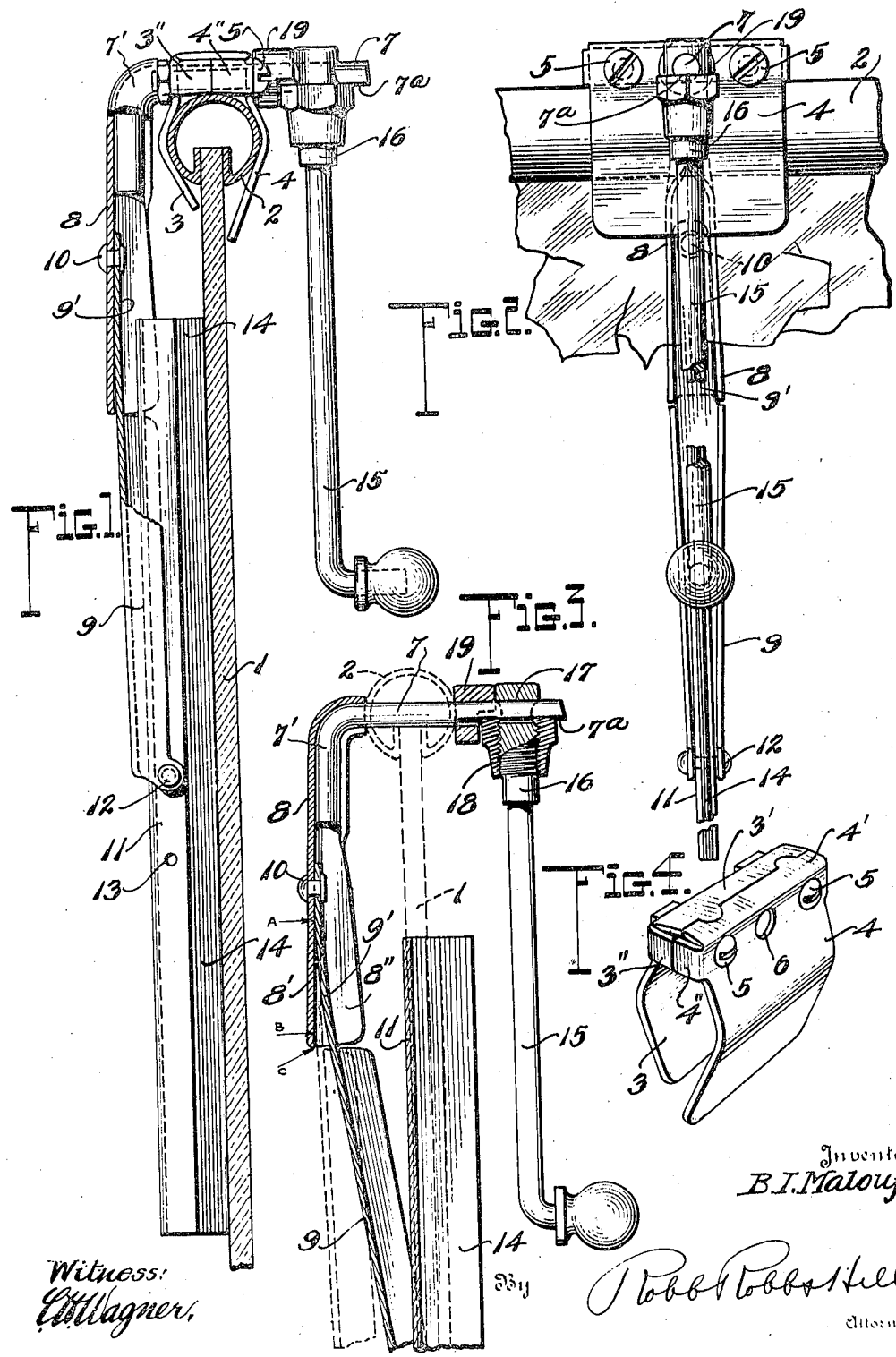
Sept. 6, 1927. 1,641,683
B. I. MALOUF
WINDSHIELD CLEANER
Filed Nov. 20, 1922
Inventor
B. I. Malouf Patented Sept. 6, 1927.

UNITED STATES PATENT OFFICE.

BESHARA I. MALOUF, OF SALT LAKE CITY, UTAH, ASSIGNOR, BY MESNE ASSIGNMENTS, TO TRICO PRODUCTS CORPORATION, OF BUFFALO, NEW YORK, A CORPORATION OF NEW YORK.

WINDSHIELD CLEANER.

Application filed November 20, 1922. Serial No. 602,174.

The present invention relates to windshield wipers of the well known squeegee type and it has for its primary object to provide a simple and inexpensive accessory capable of universal application to the different conventional styles of windshield constructions for automobiles or the like, thereby eliminating the necessity for the dealer in these articles to carry a plurality of types to fill the demands of the trade.

A further object of the invention resides in the employment of a self-adjusting spring for imparting to the wiper member the desired pressure against the glass to insure performance of the wiping function.

A still further object in view is the provision for adjustment of the parts such that the pressure of the wiper member against the glass may readily be increased or decreased.

Another feature of importance lies in the elimination of any handle contact with the glass upon the inner side of the windshield and upon which contact the majority of the cleaners of this type depend for maintaining the coaction of the wiper member with the exterior surface.

With the above and other objects in view, the invention consists in certain combinations and arrangements of the parts as will more fully appear as the description proceeds, the novel features thereof being pointed out in the appended claims.

In the drawing:

Figure 1 is a side elevation of an embodiment of this invention, parts being broken away and shown in section, showing the application of the wiper to a windshield by means of a clamp.

Figure 2 is an end elevation looking toward the inner face of the windshield.

Figure 3 is a vertical sectional view of the wiper, showing in full lines the normal position of the wiping element when removed from a windshield.

Figure 4 is a perspective view of a clamp designed to be used with this invention for applying it to windshields.

Corresponding and like parts are referred to in the following description and indicated in all of the views of the drawings, by like reference characters.

Referring to the drawing, 1 indicates a windshield glass and 2 the upper frame piece or bar therefor, such as conventionally employed in windshields for automobiles. The wiper device forming the subject matter of this invention is designed to be applied in operative position either by means of a clamp secured to the top of the frame or to the side thereof, or by drilling a hole through the frame and dispensing with the clamping bracket. The first method of application is shown in Figures 1 and 2 and the second method is shown in Figure 3.

In following the first method of attachment, I employ a clamping bracket such as clearly shown in Figure 4, consisting of the complemental sheet metal plates 3 and 4, provided with spacing edge contacting flanges 3', 3" and 4', 4", respectively. The only difference between these plates lies in the length of the one designated 4, which is arranged on the inner side of the shield opposite the wiper member and is the longer of the two for the purpose of overcoming the tendency of the pressure of the wiper member to rock or tilt the clamp. These clamping plates are secured by means of the bolts 5 to the windshield, and between these is provided a hole 6 forming a bearing for the shaft 7 of the wiper device now to be specifically described.

The shaft 7 at its outer end is bent downwardly as indicated at 7' and has fixedly secured thereto a support or hanger 8 which is tubular in form at the top to snugly embrace the bent extremity 7', especially at the elbow, and U-shaped in cross section at the lower portion 8', thus forming a channel.

To this channel portion is secured one end of a pressure producing connector or support 9 for the wiper bar. This supporting member is made of spring steel, is channel-like in form and provided with a curving spring extension 9' at the top, as more clearly apparent in Figure 3, depicting in full lines the normal position of the element when removed from the windshield. The spring extremity 9' is secured to the hanger 8 well toward the center thereof by means of a rivet 10 so that the sides 8" of the hanger coact therewith to prevent any tendency to lateral displacement while the lower end of the hanger limits the outward movement of the spring, thus producing in action a pressure point or face by means of which the pressure of the wiper against the surface of the glass may be increased as hereinafter explained.

To the pressure producing element 9 is connected a wiper bar 11 the pivot connection 12 being substantially midway of the bar. By providing an extra opening 13 or more this bar may be adjusted so that the wiping action upon the windshield will take place within the range of vision of the operator. The wiper bar is composed of a folded strip of metal between which is clamped the strip of flexible rubber 14 adapted to contact with the surface of the glass and to flex from side to side during the wiping movements. The wiper bar at the top seats between the sides of the spring connector and the hanger element above mentioned and, therefore, is prevented from twisting at the pivot connection.

The wiper device is actuated by an operating handle 15 arranged on the inner side of the windshield in spaced relation to the glass and adjustably mounted upon the inner end of the shaft 7. At this end the shaft metal is cut away at one side as indicated at 7ª to provide a flattened surface. The upper end of the handle 15 carries a head 16 having an opening 17 therethrough to receive the shaft 7, the head being exteriorly threaded to receive a locking nut 18 which is screwed upwardly against the flattened surface 7ª in fixing the handle in position on the shaft. This effectively prevents the handle from turning relatively to the shaft 7 as will be quite obvious. To prevent the nut 18 from marring the bracket or the windshield frame member, as the case may be, as well as to provide for the clearance of the handle with respect to the glass, I interpose a spacing washer 19 on the shaft 7. This washer is also cut away at one end to form a seat in which the edge of the nut 18 is received, as shown clearly in Figures 1 and 3.

With the foregoing in view, the application and operation of the device will be apparent. After applying the clamp shown in Figure 4 to the windshield the shaft 7 is passed through the opening 6 and the spacing washer 19 slipped over the inner end against the face of the bracket. The handle 15 is now applied and moved inwardly to a position which produces sufficient pressure upon the wiper member by straightening out the spring 9' more or less, whereupon the locking nut 18 is screwed upwardly against the shaft to hold the latter against displacement under the action of the spring. As the pressure is increased the spring straightens out until it may finally be brought into contact with the base of the channel 8' but even greater pressure may be produced by moving the shaft 7 inwardly, owing to this contact if the increased pressure is necessary or desired. This is determined to a great extent by the width of the rubber strip 14 or the flexibilty thereof as well as the diameter of the frame piece of the windshield, all of which may vary without preventing the proper pressure being obtained in the application of the device. Naturally the reverse movement of the handle of the shaft 7 will decrease the tension applied to the wiper bar.

The application of the device without the clamp simply requires the drilling of a proper sized opening through the frame bar of the windshield after the manner clearly depicted in Figure 3.

Having thus described my invention, what I claim as new and desire to secure by Letters Patent, is:

1. A windshield cleaner comprising a shaft with a depending channeled part having spaced side walls, a wiper member, and a wiper supporting member connected at its lower end to the wiper member and having a spring extension from its upper end disposed substantially wholly within the channeled part and between the side walls thereof, so as to be laterally reinforced and guided thereby, said spring extension being normally curved toward the open side of the channeled part and secured at its free end to said channeled part.

2. A windshield cleaner of the class described comprising a shaft provided with a depending portion of channel form having side walls, a wiper member, and supporting means for said wiper member having a spring portion disposed substantially wholly within the channel portion and having its adjacent end fixed therein whereby to restrict the relative movements between the supporting means and said depending portion.

3. A windshield cleaner of the class described comprising a shaft, a hanger connected to said shaft and depending in advance of the windshield, a wiper member, means of channel form intermediate the wiper member and the hanger aforesaid and having a spring extension, the end of said extension being fixed to said hanger at a point removed from the free end of the hanger and of the extension, and a handle connected to the opposite end of the shaft from the hanger for operating the same.

4. A windshield cleaner comprising a shaft with a depending channeled part having spaced side walls, a wiper member, and a channeled wiper supporting member connected at its lower end to the wiper member and having a spring extension from the upper end of the bottom of its channel, said extension extending into and lying substantially wholly within the channeled part of said shaft to be guided by the side walls of said channeled part, the side walls of said channeled wiper supporting member terminating in proximity to and substantially constituting continuations of the side walls of said channeled part, said wiper member being receivable within the channels of said channeled wiper supporting member.

In testimony whereof I affix my signature.

BESHARA I. MALOUF.